United States Patent [19]

Jans

[11] Patent Number: 5,038,465
[45] Date of Patent: Aug. 13, 1991

[54] DEVICE FOR INSTALLING MARKER BALLS ON OVERHEAD CABLES, PARTICULARLY LIVE POWER CABLES

[76] Inventor: Donato Jans, Via Circonvallazione 17, 11026 Pont Saint Martin (Province of Aosta), Italy

[21] Appl. No.: 583,127

[22] Filed: Sep. 17, 1990

[30] Foreign Application Priority Data

Sep. 22, 1989 [IT] Italy ............................. 67787 A/89

[51] Int. Cl.⁵ ............................................. B23Q 7/10
[52] U.S. Cl. ...................................... 29/818; 29/453; 29/463; 211/86
[58] Field of Search ............... 29/433, 445, 453, 463, 29/525.1, 809, 818, 817; 116/209, DIG. 33; 221/185, 312 C, 295, 301

[56] References Cited

U.S. PATENT DOCUMENTS

| 2,829,550 | 4/1958 | Hamshaw | 29/817 X |
| 3,374,525 | 3/1968 | Petry | 29/810 X |
| 3,430,325 | 3/1969 | Lematta | 29/463 X |
| 4,377,027 | 3/1983 | Price | 29/817 X |
| 4,885,835 | 12/1989 | Osgood | 29/463 |

Primary Examiner—Joseph M. Gorski
Assistant Examiner—Peter Dungba Vo
Attorney, Agent, or Firm—Guido Modiano; Albert Josif

[57] ABSTRACT

The device is constituted by a structure which is intended to be suspended from a barycentric hook of a helicopter and comprises a first section with at least two facing magazines, each of which is suitable for containing and distributing, in a relationship of mutual juxtaposition, a plurality of half-spheres for the composition and installation of a corresponding plurality of marker balls; and a second section, arranged below the first one, which comprises means for the positioning of the entire structure on the cable of the overhead line and means for installing the facing semi-spheres which comprise fluid-actuated jack elements suitable for mutually compressing and connecting the semi-spheres to thereby form and close the marker balls on the cable.

14 Claims, 2 Drawing Sheets

Fig. 1
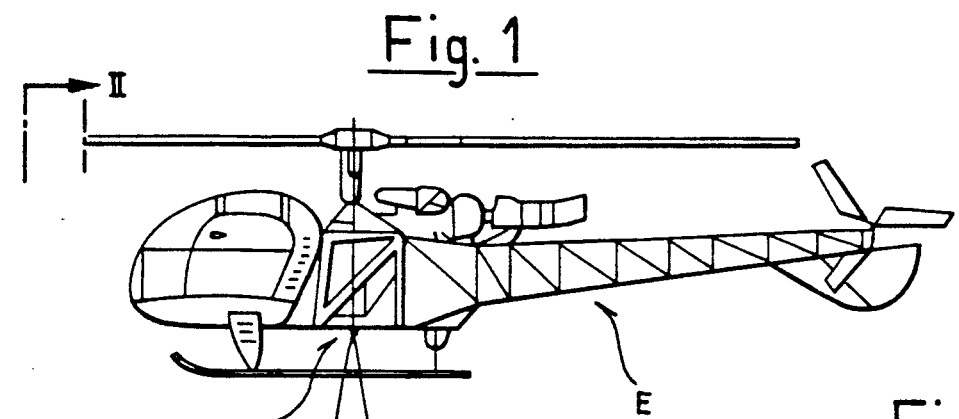
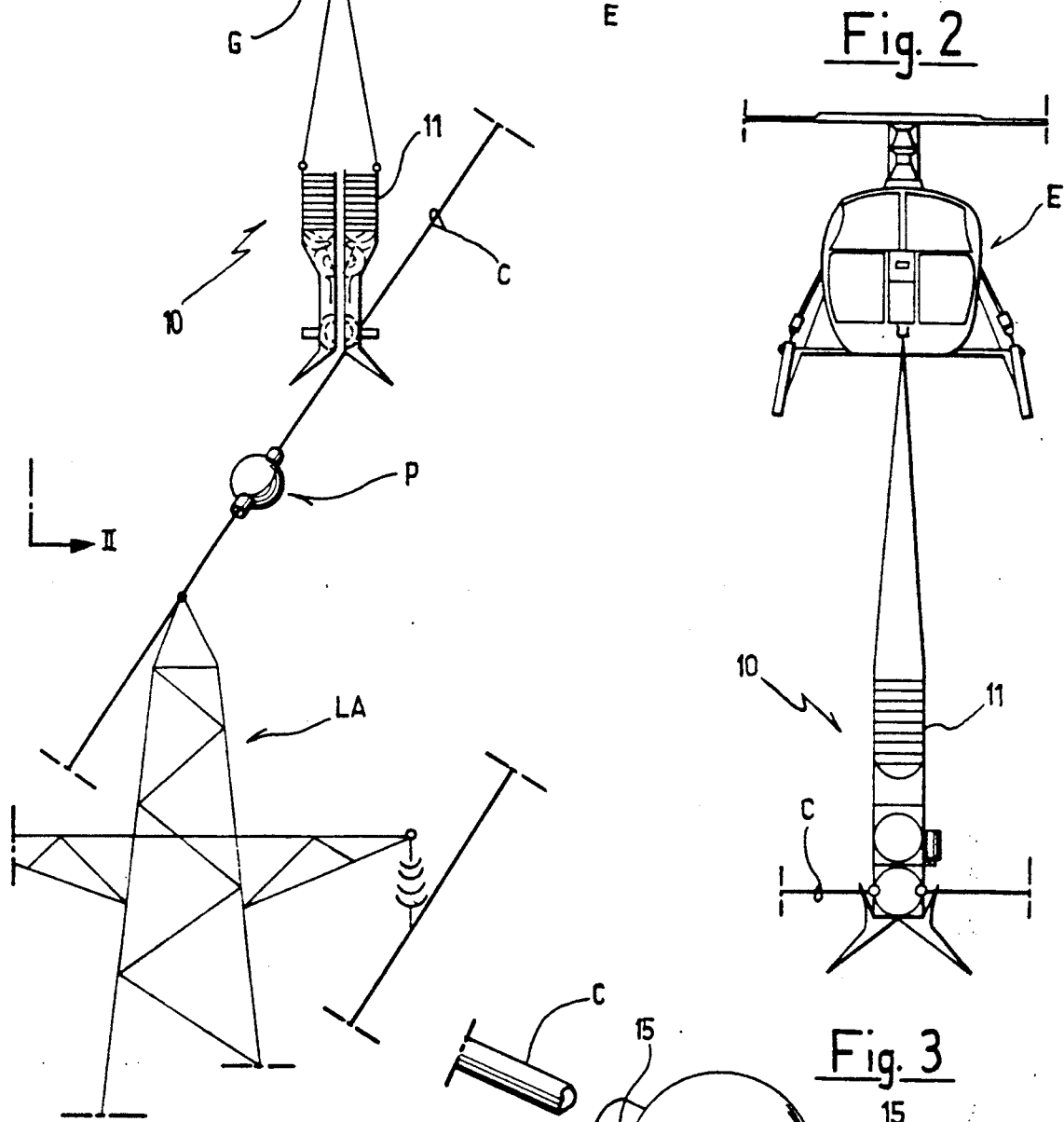
Fig. 2
Fig. 3
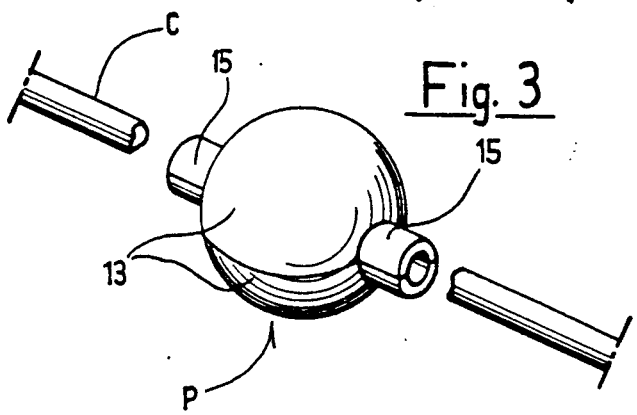

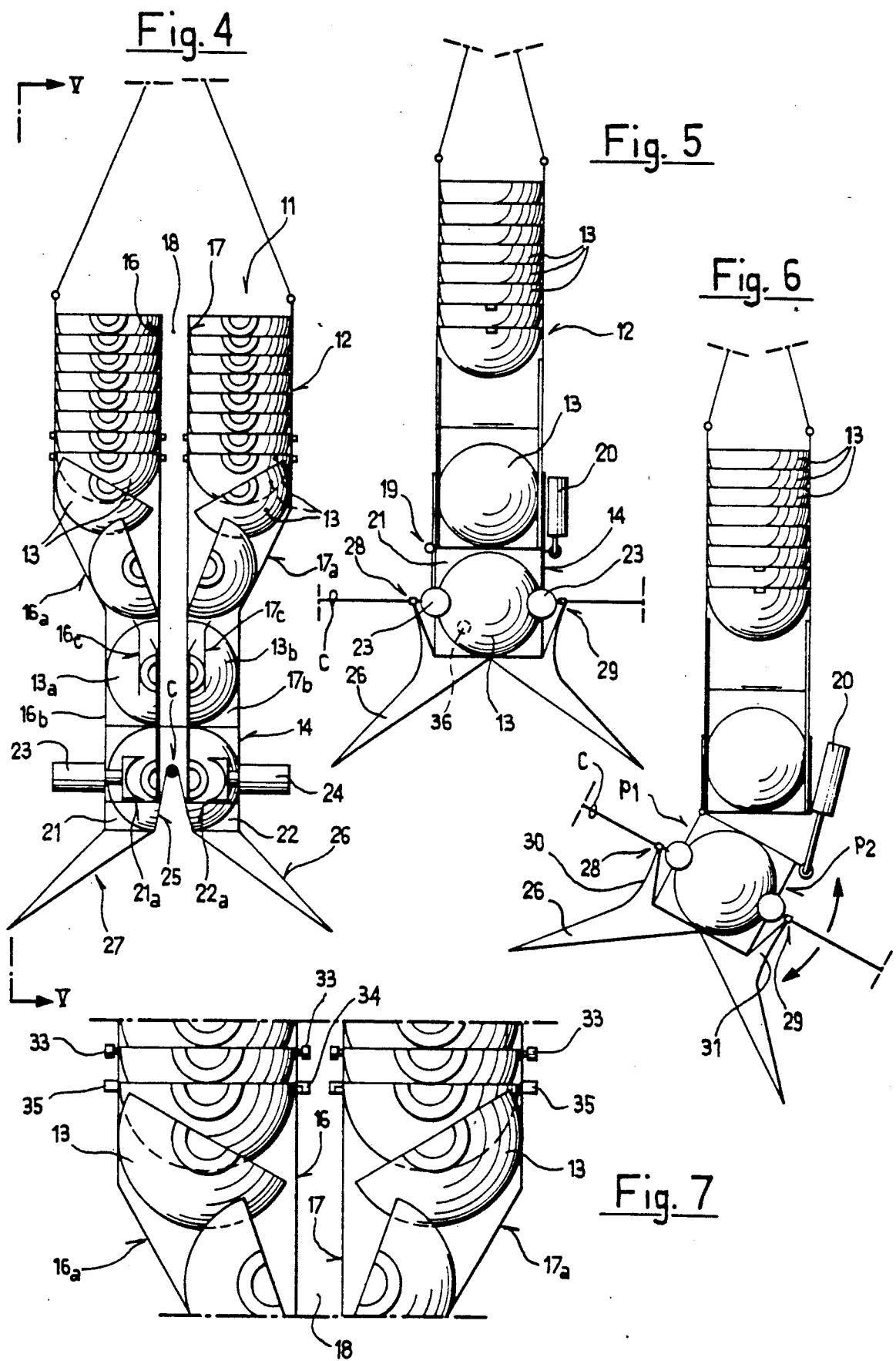

DEVICE FOR INSTALLING MARKER BALLS ON OVERHEAD CABLES, PARTICULARLY LIVE POWER CABLES

BACKGROUND OF THE INVENTION

The present invention relates to a device for the automated installation, by means of helicopters, of marker balls on overhead lines, such as power lines, mountain telferages, cableways and the like.

The considerable increase in air traffic, even at low altitudes, by aircrafts such as helicopters, small leisure aeroplanes, ultralight aircraft for sports use and the like, has made mandatory the marking of the cables of overhead lines used for any purpose.

In particular, currently applicable laws mandate the visual marking of the cables of power lines when their height from the ground exceeds 50 meters and of mountain telferages if they are located at elevations in excess of four meters from the top of the underlying wooded areas.

As is known, the visual marking of overhead lines is performed by means of variously colored balls which are coupled onto the cable and, for this purpose, are constituted by two half-spheres made of polymeric material or the like, provided with elements for mutual snap-together coupling, for example mutually cooperating hooks and slots.

The installation of said marking means on existing facilities is usually performed with the aid of helicopters, the use whereof is moreover indispensable in the case of power lines, along which personnel cannot move once they are live and which, on the other hand, cannot be deactivated for a long time, both for economical reasons and for requirements of continuity of the service.

Installation is currently performed by highly specialized operators, who are suspended from the helicopter in stationary flight and manually perform the installation of each ball on the cables of the line.

These are obviously slow, very expensive operations which are subject to considerable risks and for which the use of twin-engine helicopters is strictly prescribed in order to reduce the risks arising from malfunctions.

SUMMARY OF INVENTION

The aim of the present invention is to eliminate these severe disadvantages, and within the scope of this general aim it has the important object of providing a device which, supported by the helicopter in stationary flight, performs the installation of the marker balls automatically, without requiring the manual intervention of any operator, and therefore with absolutely no risk and with a high operating speed.

Another object of the invention is to provide a device which, by virtue of the absence of suspended operators and of its structural simplicity, allows the use of single-engine helicopters, to the full advantage of the reduction of operating costs and ease in maneuvering.

A further important object of the present invention is to provide a device which is structurally simple and is highly reliable in operation.

In order to achieve this aim, these important objects and others which will become apparent from the following detailed description, the present invention relates to a device for the automated installation, by means of helicopters, of marker balls on overhead lines, particularly power lines, characterized in that it is constituted by a structure which is intended to be suspended from the barycentric hook of the helicopter, comprising a first section with at least two facing magazines, each magazine being suitable for containing and distributing, in a relationship of mutual juxtaposition, a plurality of half-spheres for the composition and installation of a corresponding plurality of marker balls, and a second section, arranged below the first one, which comprises means for the positioning of the entire structure on the cable of the overhead line and means for installing the facing half-spheres, said means comprising fluid-actuated jack elements suitable for mutually compressing and connecting said half-spheres to thereby form and close said marker balls on said cable.

BRIEF DESCRIPTION OF THE DRAWINGS

Further purposes, characteristics and advantages will become apparent from the following detailed description and with reference to the accompanying drawings, given by way of non-limitative example, wherein:

FIG. 1 is a schematic lateral elevation sectional view of the device, illustrating the method for its use;

FIG. 2 is a front sectional elevational view of the device rotated through 90° with respect to the sectional view of FIG. 1;

FIG. 3 is a perspective detail view of a marker ball;

FIG. 4 is an enlarged-scale schematic sectional view of the device of FIG. 1;

FIG. 5 is an enlarged-scale schematic sectional view of the device, rotated through 90° with respect to the sectional view of FIG. 4;

FIG. 6 is a sectional view, similar to FIG. 5, illustrating the method of operation of the means for positioning the structure on the cable;

FIG. 7 is an enlarged-scale detail view of FIG. 4.

DESCRIPTION OF THE PREFERRED EMBODIMENT

In the drawings, the reference numeral 10 generally indicates the device, which is constituted by a metallic structure 11 which is intended to be suspended from the barycentric hook G of an airlifting means such as a helicopter E which, hovering in stationary flight above the overhead line LA, keeps said structure in the vertical plane which contains the cable C of the line which is to receive the marker balls P.

The structure 11 comprises a first section 12 for containing the half-spheres 13 suitable for composing the balls P and a second section 14 for the positioning of the structure on the cable and the installation of the individual balls by juxtaposition and connection of corresponding pairs of half-spheres 13. As seen in FIG. 4, the second section 14 constitutes a means to store and align a pair of a half-spheres 13 in a manner such that they are in ready alignment for connection about the cable C.

Said half-spheres, which are of a per se known type, are constituted by a hollow shell made of polymeric material and have cooperating snap-together coupling means, such as hooks and slots, or undercuts, preferably arranged on end sleeves 15 suitable for clamping the cable C as illustrated in detail in FIG. 3.

The first section 12 of the structure 11 comprises magazine means for storing a plurality of half-spheres 13, such magazine means advantageously comprising two flanking magazines 16–17, each of which is dimensioned in an upper portion thereof so as to store a plurality of half-spheres 13 arranged in a relationship of superimposition and orientated with their convex part downward; the capacity of said magazines depends on their height, which is generally comprised between 1000 and 1500 mm.

As clearly illustrated in the figure, the magazines 16 and 17 are separated by a central gap 18 which is open downward; the width of said gap is at least such as to allow B the easy passage of the cable C or of old balls to be covered.

In their lower portion, the magazines have respective funnel-shaped tapered regions 16a-17a which end with distribution channels 16b-17b. In the tapered regions, the half-spheres 13 undergo, due to the combined action of controlled retention elements which will be described hereinafter, a 90° tilting so as to arrange themselves in facing pairs 13a-13b in the respective distribution channels 16b-17b, separated by the gap 18, as clearly illustrated in the figures.

Advantageously, each distribution channel has vertical panels 16c-17c suitable for engaging the sleeves 15 of the half-spheres 13 to guide and retain them.

The device 10 also comprises rotation orientation means for rotatably orientating the half-sphere storage alignment means in a plurality of positions defined in a vertical plane in which the cable C of the line is arranged. More particularly, the second section 14 of the structure 11 is arranged immediately below the distribution channels 16b-17b and is articulated to the first section 12 by means of a lateral hinge 19 which allows it to orientate itself in the vertical plane in which the cable C of the line is arranged.

A fluid-actuated jack 20, the cylinder whereof is articulated to the first section and the stem whereof is articulated to the second section (or vice versa), actuates the rotation of said second section in said vertical plane. Two holder compartments 21-22 are formed in the section 14 for respective half-spheres arriving from the overlying distribution channels 16b-17b. Said compartments are open downward and have lateral horizontal panels 21a-22a on which the sleeves 15 of the half-spheres 13 abut in order to retain them. Respective presser elements of half-sphere presser means furthermore extend into the compartments and are constituted by pairs of fluid-actuated jacks 23-24 suitable for pushing the facing half-spheres into mutual snap-together coupling, so that said half-spheres are closed onto the cable C, which as a consequence of the operative positioning of the structure is arranged inside the gap 18 at the diametrical axis of the facing half-spheres.

For this purpose, cable guiding and positioning means are provided which are advantageously constituted by two guiding and positioning notches 25 in the shape of an inverted V are formed on the opposite walls p1-p2 of the compartments 21-22 and are orthogonal to the plane of arrangement of the cable C; the vertex of said V, which is intended to abut on the cable, is substantially arranged at said diametrical axis of the half-spheres. A four-footed structure 26 which is composed of divaricated uprights and is used for the static resting of the device on the ground, extends below the compartments 21 and 22 and also defines a guiding channel 27 for the cable C which blends with the notches 25. Two opposite sensors 28-29 contribute to the operative positioning of the entire structure, are arranged at the respective vertices of the notches 25 and are supported, for example, by corresponding wings 30-31 of the four-footed structure 26. Circuit means, associated with said sensors and not illustrated in the figure, activate an indication of correct positioning which is also transmitted to the cabin of the helicopter E, when both sensors are engaged by the cable C. In the line sections in which the cable is horizontal, this occurs with the jack 20 idle in retracted position and with the second section 14 of the structure aligned with the first section 12. If the cable portion involved in the installation of the ball is inclined, as illustrated for example in FIG. 6, contact occurs between a single sensor, for example the sensor 28, and the cable C. To this condition there corresponds the activation of the jack 20, on the part of said electric circuit means, for example by means of the opening of an electric valve which connects said jack to a source of pressurized fluid, or by means of the energization of a pump for the delivery of said fluid.

This is followed by the extension of the jack 20, which causes the rotation of the second section 14 of the structure about the axis of the hinge 19, said second section arranging itself parallel to the portion of cable involved; rotation is interrupted when the second sensor 29 also makes contact with the cable C. Once positioning has occurred, by means of a manual control, such as a switch which can be actuated by the operator on board the helicopter, the presser elements 23-24 are activated, for example by means of the opening of respective electric valves for feeding the pressurized fluid. Said presser elements, by acting on the end sleeves 15 of the half-spheres 13, provide their connection and consequently the installation on the cable of the ball which is the result of said coupling of the half-spheres. The activation of the presser elements is preferably controlled by the enabling signal provided by both sensors 28-29 and can even be produced automatically by said electric circuit elements when both sensors are engaged by the cable C.

Similarly, the passage of the half-spheres 13 from the respective magazine to the underlying distribution channel is controlled by a sensor which senses the presence of the half-spheres in the respective holder compartments 21-22; said sensor controls the distribution of new half-spheres into the holder compartments after a ball has been installed on the cable.

For this purpose, each magazine has a set of three electromagnetic retention elements 32-33 and 34, which are constituted for example by known bolts actuated by respective solenoids.

A pair 32-33 of said bolts is provided for the retention of the next to last half-sphere of the stack, whereas the third bolt 34 retains, in cooperation with a fixed stop element 35, the last half-sphere of the stack in a position which faces the distribution channel. When said presence sensor, for example constituted by a feeler 36, or by an optical photodiode-transistor pair, senses the absence of half-spheres in the compartments 21-22, it first of all actuates the opening of the bolt 34, which releases the last half-sphere of the stack, which, being retained by the fixed stop element 35, rotates about said stop element and arranges itself edge-on to enter the respective distribution channel, as is clearly illustrated in the FIG. 7. After this, the bolt 34 returns to its stop position and provides the enabling signal for the opening of the bolts 32-33 which release the overlying stack of half-spheres, which moves downward and abuts on the bolt 34 and on the stop element 35 to allow the repetition of the controlled distribution cycle.

The execution of the circuit means suitable for providing the described control sequences is straightforward in design for the technician and its diagram, which in any case is non-limitative for the execution of the present invention, is therefore omitted.

Though the concept of the invention is invariant, the details of execution and the embodiments may furthermore naturally be varied extensively with respect to what is described and illustrated by way of non-limitative example without thereby abandoning the scope of the invention.

I claim:

1. Device for an automated installation of marker balls on overhead cables, each of said marker balls comprising a pair of substantially half-spheres which are mutually connectable about a cable portion of the overhead cables to thereby form and connected said marker ball to said cable portion, said device comprising:

structure means suspended from an airlifting means for engagement thereof with the cable portion;

cable guiding and positioning means supported by said structure means for accurately positioning said structure means relative to the cable portion;

half-sphere storage alignment means supported by said structure means for accurately storing in proper alignment a pair of said half-spheres in a relative position relationship to be ready for connection about the cable portion;

half-sphere presser means supported by said structure means for pushing said pair of half-spheres which are properly aligned in said half-sphere storage alignment means mutually together about the cable portion;

wherein said device further comprises:

magazine means supported by said structure means for storing a plurality of the marker ball half-spheres; and feeding means supported by said structure means for feeding the half-spheres from said magazine means to said half-sphere storage alignment means.

2. Device according to claim 1, wherein said magazine means comprise two flanking magazines of a first section of said structure means, each of said two flanking magazines store a plurality of half-spheres arranged in a superimposed stacked relationship with their convex portions thereof facing downwardly, said feeding means comprising a pair of funnel-shaped tapered regions being connected below said two flanking magazines and extending therefrom into respective distribution channels, said funnel-shaped regions allow a 90 degree tilting of said half-spheres from said upper portions to thereby be arranged in mutually facing pairs in said distribution channels.

3. Device according to claim 1, wherein said magazine means comprise two flanking magazines of a first section of said structure means, each of said two flanking magazines store a plurality of half-spheres arranged in a superimposed stacked relationship with their convex portions thereof facing downwardly, said feeding means comprising a pair of funnel-shaped tapered regions being connected below said two flanking magazines and extending therefrom into respective distribution channels, said funnel-shaped regions allow a 90 degree tilting of said half-spheres from said upper portions to thereby be arranged in mutually facing pairs in said distribution channels, said half-sphere storage alignment means comprising a pair of holder compartments of a second section of said structure means which are respectively arranged below and connected to said distribution channels, said half-sphere presser means comprising pairs of fluid-actuated jacks which are connected to and extend in said holder compartments.

4. Device according to claim 1, wherein said magazine means comprise two flanking magazines of a first section of said structure means, each of said two flanking magazines store a plurality of half-spheres arranged in a superimposed stacked relationship with their convex portions thereof facing downwardly, said feeding means comprising a pair of funnel-shaped tapered regions being connected below said two flanking magazines and extending therefrom into respective distribution channels, said funnel-shaped regions allow a 90 degree tilting of said half-spheres from said upper portions to thereby be arranged in mutually facing pairs in said distribution channels, said half-sphere storage alignment means comprising a pair of holder compartments of a second section of said structure means which are respectively arranged below and connected to said distribution channels, a central gap being provided which separates said two flanking magazines, said pair of funnel-shaped tapered regions, said distribution channels, and said holder compartments, said holder compartments being downwardly open and being provided with lateral horizontal panels extending to said central gap, said horizontal panels retain thereon sleeves of said half-spheres, said cable guiding and positioning means comprising two guiding and positioning notches in the shape of an inverted V formed on opposite walls of said holder compartments and having its vertex arranged at the lower end of said central gap and adapted to accommodate said cable portion, said cable guiding and positioning means further comprising a four-footed structure extending below said holder compartments and defining a guiding channel which blends with said notches, said four-footed structure comprising divaricated uprights and being adapted for the static resting of said device on the ground.

5. Device according to claim 1, wherein said magazine means comprise two flanking magazine of a first section of said structure means, each of said two flanking magazines store a plurality of half-spheres arranged in a superimposed stacked relationship with their convex portions thereof facing downwardly, said feeding means comprising a pair of funnel-shaped tapered regions being connected below said two flanking magazines and extending therefrom into respective distribution channels, said funnel-shaped regions allow a 90 degree tilting of said half-spheres from said upper portions to thereby be arranged in mutually facing pairs in said distribution channels, said half-sphere storage alignment means comprising a pair of holder compartments of a second section of said structure means which are respectively arranged below and connected to said distribution channels.

6. Device according to claim 5, wherein vertical panels are provided in said distribution channels and in said holder compartments for guiding and retention therein of sleeves provided on said half-spheres.

7. Device according to claim 1, wherein said magazine means comprise two flanking magazines of a first section of said structure means, each of said two flanking magazines store a plurality of half-spheres arranged in a superimposed stacked relationship with their convex portions thereof facing downwardly, said feeding means comprising a pair of funnel-shaped tapered regions being connected below said two flanking magazines and extending therefrom into respective distribution channels, said funnel-shaped regions allow a 90 degree tilting of said half-spheres from said upper portions to thereby be arranged in mutually facing pairs in said distribution channels, said half-sphere storage alignment means comprising a pair of holder compartments of a second section of said structure means which are respectively arranged below and connected to said distribution channels, a central gap being provided which separates said two flanking magazines, said pair of funnel-shaped tapered regions, said distribution channels, and said holder compartments, said holder compartments being downwardly open and being provided with lateral horizontal panels extending to said central gap, said horizontal panels being adapted to retain thereon sleeves of said half-spheres.

8. Device according to claim 7, wherein said feeding means further comprise first sensor means for sensing the presence of the half-spheres in said holder compartments, said feeding means further comprising electromagnetic retention elements electrically connected to said first sensor means, said electromagnetic retention elements being constituted by a pair of simultaneously activated solenoid actuated bolts arranged at each lower end and at opposite sides of a respective one of said flanking magazines, and by a single solenoid actuated bolt arranged below said pair of bolts at said central gap, a fixed retention bolt arranged on each one of said flanking magazines opposite to said single bolt.

9. Device for an automated installation of marker balls on overhead cables, each of said marker balls comprising a pair of substantially half-spheres which are mutually connectable about a cable portion of the overhead cables to thereby form and connect said marker ball to said cable portion, said device comprising;
structure means suspended from an airlifting means for engagement thereof with the cable portion;
cable guiding and positioning means supported by said structure means for accurately positioning said structure means relative to the cable portion;
half-sphere storage alignment means supported by said structure means for accurately storing in proper alignment a pair of said half-spheres in a relative position relationship to be ready for connection about the cable portion;
half-sphere presser means supported by said structure means for pushing said pair of half-spheres which are properly aligned in said half-spheres storage alignment means mutually together about the cable portion;
wherein said device further comprises;
rotation orientation means for rotatably orientating said half-spheres storage alignment means in a substantially vertical plane, said half-sphere storage alignment means thereby being alignable in a plurality of positions defined in the vertical plane to allow said marker balls to be automatically installed on overhead cables extending in different directions in the vertical plane.

10. Device according to claim 9, wherein said rotation orientation means comprises a hinge connection between said half-sphere storage alignment means and said structure means, and a fluid-actuated jack means interconnected between said structure means and said half-spheres storage alignment means.

11. Device according to claim 10, wherein said rotation orientation means further comprises sensor means arranged on said half-sphere storage alignment for sensing correct alignment of said half-sphere storage alignment means with respect to the cable portion, and circuit means interconnected between said sensor means and said fluid-actuated jack means.

12. Device for an automated installation of marker balls on overhead cables, each of said marker balls comprising a pair of substantially half-spheres which are mutually connectable about a cable portion of the overhead cables to thereby form and connect said marker balls to said cable portion, said device comprising:
structure means suspended from an airlifting means for engagement thereof with the cable portion;
cable guiding and positioning means supported by said structure means for accurately positioning said structure means relative to the cable portion;
half-sphere storage alignment means supported by said structure means for accurately storing in proper alignment a pair of said half-spheres in a relative position relationship to be ready for connection about the cable portion;
half-sphere presser means supported by said structure means for pushing said pair of half-spheres which are properly aligned in said half-sphere storage alignment means mutually together about the cable portion;
wherein said device further comprises;
magazine means supported by said structure means for storing a plurality of the marker ball half-spheres;
feeding means supported by said structure means for feeding the half-spheres from said magazine means to said half-sphere storage alignment means; and
rotation orientation means for rotatably orientating said half-sphere storage alignment means in a substantially vertical plane, said half-sphere storage alignment means thereby being alignable in a plurality of positions defined in the vertical plane to allow marker balls to be automatically installed on overhead cables extending in different directions in the vertical plane.

13. Device according to claim 12, wherein said magazine means comprise two flanking magazines a first section of said structure means, each of said two flanking magazines store a plurality of half-spheres arranged in a superimposed stacked relationship with their convex portions thereof facing downwardly, said feeding means comprising a pair of funnel-shaped tapered regions being connected below said two flanking magazines and extending therefrom into respective distribution channels, said funnel-shaped regions allow a 90 degree tilting of said half-spheres from said upper portions to thereby be arranged in mutually facing pairs in said distribution channels, said half-sphere storage alignment means comprising a pair of holder compartments of a second section of said structure means which are respectively arranged below and connected to said distribution channels, vertical panels being provided in said distribution channels and in said holder compartments for guiding and retention therein of sleeves provided on said half-spheres, said half-sphere presser means comprising pairs of fluid-actuated jacks which are connected to and extend in said holder compartments, a central gap being provided which separates said two flanking magazines, said pair of funnel-shaped tapered regions, said distribution channels, and said holder compartments, said holder compartments being downwardly open and being provided with lateral horizontal panels extending to said central gap, said horizontal panels being adapted to retain thereon sleeves of said half-spheres, said cable guiding and positioning means comprising two guiding and positioning notches in the shape of an inverted V being formed on opposite walls of said holder compartments and having its vertex arranged at the lower end of said central gap and adapted to accommodate said cable portion, said cable guiding and positioning means further comprising a four-footed structure extending below said holder compartments and defining a guiding channel which blends with said notches, said four-footed structure comprising divaricated uprights and being adapted for the static resting of said device on the ground, said feeding means further comprising first sensor means for sensoring the presence of the half-spheres in said holder compartments, said feeding means further comprising electromagnetic retention elements electrically connected to said first sensor means, said electromagnetic retention elements being constituted by a pair of simultaneously activated solenoid actuated bolts arranged at each lower end and at opposite sides of a respective one of said flanking magazines, and by a single solenoid actuated bolt arranged below said pair of bolts at said central gap, a fixed retention bolt being arranged on each one of said flanking magazines opposite to said single bolt, said rotation orientation means comprising a hinge connection between said half-sphere storage alignment means and said structure means, and a fluid-actuated jack means interconnected between said structure means and said half-sphere storage alignment means, said rotation orientation means further comprising second sensor means arranged on said half-sphere storage alignment for sensing correct alignment of said half-sphere storage alignment means with respect to the cable portion, and circuit means interconnected between said second sensor means and said fluid-actuated jack means.

14. Device according to claim 13, wherein said second sensor means comprises two opposite sensors arranged at respective vertices of said notches, said two opposite sensors being supported by wings defined on said four-footed structure.

* * * * *